(12) United States Patent
Le

(10) Patent No.: US 11,902,571 B2
(45) Date of Patent: Feb. 13, 2024

(54) REGION OF INTEREST (ROI)-BASED UPSCALING FOR VIDEO CONFERENCES

(71) Applicant: ADVANCED MICRO DEVICES, INC., Santa Clara, CA (US)

(72) Inventor: Roto Le, Santa Clara, CA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 17/487,703

(22) Filed: Sep. 28, 2021

(65) Prior Publication Data

US 2023/0099034 A1 Mar. 30, 2023

(51) Int. Cl.
| | |
|---|---|
| H04N 19/59 | (2014.01) |
| H04N 19/162 | (2014.01) |
| H04N 19/167 | (2014.01) |
| H04N 19/187 | (2014.01) |
| G06N 20/00 | (2019.01) |
| G06T 3/40 | (2006.01) |

(52) U.S. Cl.
CPC ............ *H04N 19/59* (2014.11); *G06N 20/00* (2019.01); *G06T 3/4053* (2013.01); *H04N 19/167* (2014.11); *H04N 19/187* (2014.11)

(58) Field of Classification Search
CPC .... H04N 19/59; H04N 19/162; H04N 19/167; H04N 19/187; G06N 20/00; G06T 3/4053
See application file for complete search history.

(56) References Cited

U.S. PATENT DOCUMENTS 11,012,482 B1 * 5/2021 Yerli .................. H04L 65/403
11,151,383 B2 * 10/2021 Guttmann ............. G06V 20/30
11,350,029 B1 * 5/2022 Ostap ................. H04N 5/23296
2017/0339417 A1 * 11/2017 Puri ..................... G06V 10/446
2021/0352307 A1 * 11/2021 Bae ......................... G06T 5/001

OTHER PUBLICATIONS

International Search Report and Written Opinion, PCT/US2022/044321, dated Jan. 26, 2023, 8 pages.
McCullough et al., "Analysis of Machine Learning Upscaling Algorithms for Wireless Packet Loss", Jan. 1, 2020, Retrieved from the Internet URL: https://www.proquest.com/docview/2494449116?pq-brigsite=gscholar&fromopenview=true, retrieved on Jan. 18, 2023, 41 pages.
Perez-Pellitero et al., "Accelerating Super-Resolution for 4K Upscaling", 2015 IEEE International Conference on Consumer Electronics (ICCE), IEEE, Jan. 9, 2015, retrieved on Mar. 23, 2015, pp. 317-320.
Zhang et al, "Semantic Saliency Driven Camera Control for Personal Remote Collaboration", Multimedia Signal Processing, IEEE 10th Workshop ON, IEEE, Piscataway, NJ, USA, Oct. 8, 2008, pp. 28-33.

* cited by examiner

*Primary Examiner* — Tracy Y. Li (57) ABSTRACT

Region of interest (ROI)-based upscaling for video conferences, the method including: identifying, in a video frame of a video conference at a first resolution, a boundary region for an object; applying, to a portion of the video frame bound by the boundary region, a machine learning upscaling algorithm to generate an upscaled portion of the video frame corresponding to a second resolution; and generating an upscaled video frame at the second resolution by combining a first plurality of pixels in the upscaled portion of the video frame corresponding to the object with a second plurality of pixels.

20 Claims, 8 Drawing Sheets

REGION OF INTEREST (ROI)-BASED UPSCALING FOR VIDEO CONFERENCES

BACKGROUND

Computing devices participating in a video conference use a camera to capture video data and send the video data to other participating computing devices. The resolution of the video data of the video conference is dependent on a variety of factors, including the resolution of displays, the capture resolution of cameras, network bandwidth, and computational power.

DETAILED DESCRIPTION

Computing devices participating in a video conference use a camera to capture video data and send the video data to other participating computing devices. The resolution of the video data of the video conference is dependent on a variety of factors, including the resolution of displays, the capture resolution of cameras, network bandwidth, and computational power. Accordingly, as display resolutions, network bandwidth, and computational resources of computing devices increases, software supporting video conferences are capable of supporting video data at higher resolutions. However, even though the video conference is capable of supporting higher resolution video, the cameras of some computing devices are limited to capturing video data at a lower resolution. For example, though participating computing devices in a video conference have adequate computational and network resources to support 4K video (e.g., 3840×2160 pixels), the camera of some computing devices are limited to 1080p video (e.g., 1920×1080 pixels).

Upscaling algorithms are used to scale lower resolution video frames to a higher resolution. Continuing the example above, video data captured using a 1080p video camera is upscaled to 4K to compensate for the lower resolution of the camera. Upscaling algorithms vary across their output quality as well as the computational resources required to implement the algorithm. For example, algorithms such as nearest-neighbor, bilinear, or bicubic interpolation use comparatively lower computational resources but produce lower quality (e.g., less accurate) output. In contrast, upscaling algorithms that use machine learning (e.g., using neural networks or other models) will produce higher quality output but require substantial computational resources.

In many video conferencing situations, the video data includes a single region of interest (ROI). A ROI is a subset of an image or video frame identified for a particular purpose. For example, the ROI of a video conference will include a human participant in the video conference as captured by the camera of their computing device. Accordingly, providing an entire video frame to a computationally intensive upscaling algorithm such as a machine learning-based upscaling algorithm uses significant computational resources to upscale portions of the video frame not of particular interest to other participants, such as the background behind a human participant.

To that end, the present specification sets forth various implementations of region of interest (ROI)-based upscaling for video conference. In some implementations, a method of ROI-based upscaling for video conferences includes identifying, in a video frame of a video conference at a first resolution, a boundary region for an object. The method also includes applying, to a portion of the video frame bound by the boundary region, a machine learning upscaling algorithm to generate an upscaled portion of the video frame corresponding to a second resolution. The method also includes generating an upscaled video frame at the second resolution by combining a first plurality of pixels in the upscaled portion of the video frame corresponding to the object with a second plurality of pixels.

In some implementations, the method further includes sending, from a first computing device participating in the video conference to at least one second computing device participating in the video conference, the upscaled video frame. In some implementations, the method also includes receiving, from a first computing device participating in the video conference by a second computing device participating in the video conference, the video frame and outputting, by the second computing device to a display, the upscaled video frame. In some implementations, the method also includes: applying another upscaling algorithm to a portion of the video frame outside the boundary region to generate the second plurality of pixels. In such a method, generating the upscaled video frame includes combining the first plurality of pixels, the second plurality of pixels, and a third plurality of pixels included in the upscaled portion of the video frame and outside the object. In some implementations, the second plurality of pixels corresponds to a background at the second resolution and generating the upscaled video frame includes mapping the first plurality of pixels to the background. In some implementations, the other upscaling algorithm is a less computationally intensive algorithm relative to the machine learning upscaling algorithm. In some implementations, the object includes a user-selected object. In some implementations, the object includes a default object type.

The present specification also describes various implementations of apparatus for ROI-based upscaling for video conferences. Such an apparatus includes a computer processor and a computer memory, where the computer memory includes computer program instructions that, when executed by the computer processor, cause the computer processor to carry out: identifying, in a video frame of a video conference at a first resolution, a boundary region for an object; applying, to a portion of the video frame bound by the boundary region, a machine learning upscaling algorithm to generate an upscaled portion of the video frame corresponding to a second resolution; and generating an upscaled video frame at the second resolution by combining a first plurality of pixels in the upscaled portion of the video frame corresponding to the object with a second plurality of pixels.

In some implementations, the apparatus also includes computer program instructions that, when executed by the computer processor, cause the computer processor to carry out: sending, from a first computing device participating in the video conference to at least one second computing device participating in the video conference, the upscaled video frame. In some implementations, the apparatus also includes computer program instructions that, when executed by the computer processor, cause the computer processor to carry out: receiving, from a first computing device participating in the video conference by a second computing device participating in the video conference, the video frame; and outputting, by the second computing device to a display, the upscaled video frame. In some implementations, the apparatus also includes computer program instructions that, when executed by the computer processor, cause the computer processor to carry out: applying another upscaling algorithm to a portion of the video frame outside the boundary region to generate the second plurality of pixels; where generating the upscaled video frame includes combining the first plurality of pixels, the second plurality of pixels, and a third plurality of pixels included in the upscaled portion of the video frame and outside the object. In some implementations, the second plurality of pixels corresponds to a background at the second resolution and generating the upscaled video frame includes mapping the first plurality of pixels to the background. In some implementations, the other upscaling algorithm is a less computationally intensive algorithm relative to the machine learning upscaling algorithm. In some implementations, the object includes a user-selected object. In some implementations, the object includes a default object type.

Also described in this specification are various implementations of a computer program product for ROI-based upscaling for video conferences. Such a computer program product is disposed upon a non-transitory computer readable medium storing computer program instructions that, when executed, cause a computer system to perform: identifying, in a video frame of a video conference at a first resolution, a boundary region for an object; applying, to a portion of the video frame bound by the boundary region, a machine learning upscaling algorithm to generate an upscaled portion of the video frame corresponding to a second resolution; and generating an upscaled video frame at the second resolution by combining a first plurality of pixels in the upscaled portion of the video frame corresponding to the object with a second plurality of pixels.

In some implementations, the computer program instructions, when executed, cause a computer system to perform: sending, from a first computing device participating in the video conference to at least one second computing device participating in the video conference, the upscaled video frame. In some implementations, the computer program instructions, when executed, cause a computer system to perform: receiving, from a first computing device participating in the video conference by a second computing device participating in the video conference, the video frame; and outputting, by the second computing device to a display, the upscaled video frame. In some implementations, the computer program instructions, when executed, cause a computer system to perform: applying another upscaling algorithm to a portion of the video frame outside the boundary region to generate the second plurality of pixels; where generating the upscaled video frame includes combining the first plurality of pixels, the second plurality of pixels, and a third plurality of pixels included in the upscaled portion of the video frame and outside the object.

Figure 1:
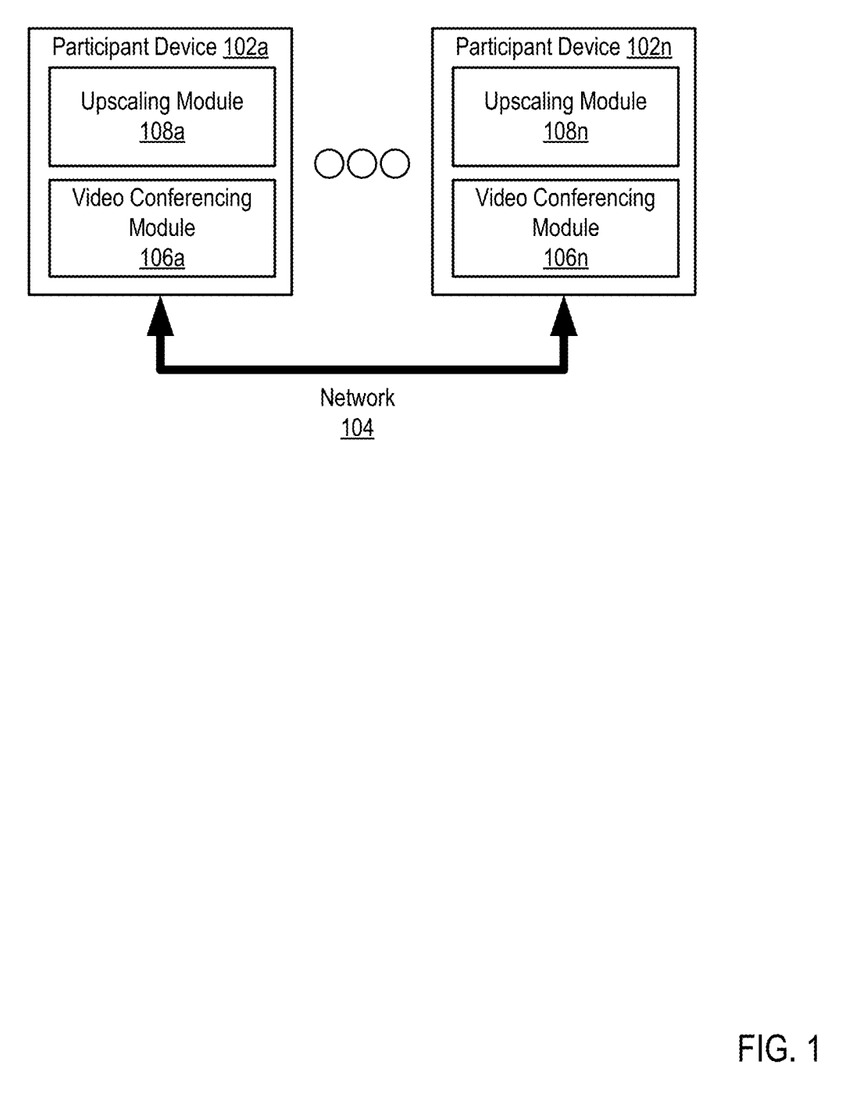
FIG. 1 is a block diagram of an example system for region of interest (ROI)-based upscaling for video conferences according to some implementations.

FIG. 1 is a block diagram of a non-limiting example system. The example system includes multiple participant devices 102a-n. Each participant device 102a-n can be implemented as one of variety of computing devices, including mobile devices, personal computers, peripheral hardware components, gaming devices, set-top boxes, and the like. The participant devices 102a-n are communicatively coupled via a network 104. The network 104 includes one or more wired networks, one or more wireless networks, combinations thereof, or other networks as can be appreciated that facilitate data communications between participant devices 102a-n.

Each participant device 102a-n includes a respective video conferencing module 106a-n. The video conferencing module 106a-n is a module facilitating a video conference between the participant devices 102a-n. The video conferencing module 106a-n encodes video data, audio data, or combinations thereof (e.g., using cameras, microphones, or other input devices of the participant device) and provides the encoded video data to other participant devices 102a-n for rendering and display. In some implementations, the video conferencing module 106a-n is configured to encode video data encoding a user interface or display of the participant device 102a-n and provide the video data to the other participant devices 102a-n for rendering and display (e.g., "screen sharing").

In some implementations, the video conferencing module 106a-n displays video and audio data of a currently speaking user in a larger window relative to other users. In other words, the video and audio data from a participant device 102a-n whose user is actively speaking (e.g., as determined by detecting incoming audio data) is displayed in a larger window, while the video of other users is displayed in respective smaller windows. Thus, while each user is visible, the video of a currently speaking user is presented in a larger window relative to other windows. In other implementations, the video of a predefined user is presented in a larger window regardless of whether the predefined user is actively speaking. For example, the video a designated presenter, host, or other higher priority user is presented in a larger window while the video of other users is presented in other windows.

One or more participant devices 102a-n also include an upscaling module 108a-n, a module for ROI-based upscaling for video conferences according to some implementations of the present disclosure. Although FIG. 1 shows each participant device 102a-n as having an upscaling module 108a-n, it is understood that in some implementations only a subset of the participant devices 102a-n will include an upscaling module 108a-n. Moreover, although FIG. 1 shows the upscaling module 108a-n as a module distinct from the video conferencing module 106a-n, it is understood that in some implementations the upscaling module 108*a-n* is implemented as part of the video conferencing module 106*a-n*.

The upscaling module 108*a-n* receives, as input, a video frame for a video conference for upscaling from a first resolution to a higher second resolution. In some implementations, the video frame is generated by the same participant device 102*a-n* executing the upscaling module 108*a-n* to which the video frame is provided as input (e.g., by a video conferencing module 106*a-n*). In other words, the video frame is upscaled before being sent to other participant devices 102*a-n* in the video conference. In other implementations, the video frame is received from another participant device 102*a-n* and upscaled prior to display by the receiving participant device 102*a-n*.

The upscaling module 108*a-n* identifies, in the video frame, a boundary region for an object. The object is an image object (e.g., a particular grouping of pixels) within the video frame. For example, in some implementations, the object corresponds to a human participant in the video conference as captured by a camera of a participant device 102*a-n* used by the human participant. One skilled in the art will appreciate that, in some implementations, the object will correspond to other regions of interest. In some implementations, the object includes a user-selected object. For example, an image segmentation algorithm is applied to the video frame and identifies multiple objects. The object for which the boundary region is identified is then selected from the identified objects. In other implementations, the object is a default object type. For example, the image segmentation algorithm identifies a human object within the video frame. The human object is then automatically selected as the object for which the boundary region is identified.

The upscaling module 108*a-n* of FIG. 1 identifies the object within the video frame using an image segmentation algorithm or other algorithm as can be appreciated. After identifying the object, the upscaling module 108*a-n* identifies the boundary region for the object. In some implementations, the boundary region includes a bounding box for the object. The bounding box is a two-dimensional rectangular region of pixels into which the object is included. For example, in some implementations, the bounding box includes a nearest fitting boundary box for the object (e.g., a bounding box having a minimum width and height so as to completely include the object). In some implementations, the bounding box includes a threshold amount of pixels between the edge of the bounding box and the object (e.g., one, two, or other relatively small number of pixels). For example, one or more sides of the bounding box is separated from a nearest portion of the object by at most the threshold amount of pixels. One skilled in the art will appreciate that boundaries other than a bounding box are also contemplated within the scope of the present disclosure.

The upscaling module 108*a-n* then applies a machine learning upscaling algorithm to a portion of the video frame bound by the boundary region to generate an upscaled portion of the video frame corresponding to a second resolution. The upscaled portion of the video frame corresponds to the second resolution in that the resolution of the portion of the video frame is upscaled proportionate to the second resolution. For example, assuming the first resolution is 1080p and the second resolution is 4K, the upscaled video frame will have a resolution four times that of the video frame. Accordingly, the upscaled portion of the video frame will have a resolution four times that of the portion of the video frame prior to upscaling.

As set forth above, the portion of the video frame bound by the boundary region includes the object (e.g., the user participating in the video conference). As the boundary region effectively defines the ROI for the video frame, a comparatively computationally intensive machine learning upscaling algorithm is applied to this subset of the video frame to produce a higher quality upscaled version of the ROI of the video frame. As an example, the portion of the video frame bound by the boundary region is provided, as input, to a neural network, deep convolutional neural network, or other trained machine learning model to generate the upscaled portion of the video frame corresponding to the second resolution. The resulting upscaled portion of the video frame thus includes an upscaled object.

To generate an upscaled video frame at the second resolution including the upscaled object, the pixels for the upscaled object must be combined with other pixels corresponding to the second resolution. Accordingly, the upscaling module 108*a-n* applies another upscaling algorithm to a portion of the video frame outside the boundary region. The other upscaling algorithm is a less computationally intensive upscaling algorithm compared to the machine learning upscaling algorithm used to upscale the portion of the video frame inside the boundary region. For example, the other upscaling algorithm requires fewer operations or fewer computational resources in order to generate an upscaled output compared to the machine learning upscaling algorithm. Though the less computationally intensive upscaling algorithm will potentially result in a lesser quality output compared to the machine learning upscaling algorithm, the less computationally intensive upscaling algorithm is only applied to portions of the frame outside the boundary region (e.g., other than the region of interest). In some implementations, the other upscaling algorithm includes, for example, a nearest-neighbor, bilinear, or bicubic interpolation algorithm, or other algorithm as can be appreciated.

After applying the other upscaling algorithm to the portion of the video frame outside the boundary region, this upscaled portion is combined with the upscaled portion of the video frame generated by the machine learning upscaling algorithm to generate the upscaled video frame. Thus, the upscaled video frame includes a first portion upscaled by the machine learning upscaling algorithm and including the upscaled object and a second portion upscaled by the other, less computationally intensive upscaling algorithm. As the first portion upscaled by the machine learning algorithm corresponds to the entire interior of the boundary region, in some implementations, the first portion will include some amount of pixels outside of the object and also upscaled by the machine learning upscaling algorithm.

In other implementations, to generate an upscaled video frame at the second resolution including the upscaled object, the pixels for the upscaled object, are mapped to a background image or background video frame. For example, assume the video conferencing module 106*a-n* supports background replacement for a video conference whereby the background of video data (e.g., video data other than a user or other region of interest) is removed and replaced with another image or video frame. Thus, the user appears to be overlayed on the replacement background. Accordingly, in some implementations, the pixels for the upscaled object are mapped to a background (e.g., a background image or background video frame) at the second resolution. In some implementations, the background is upscaled or downscaled to the second resolution before the pixels of the upscaled object are mapped to the background.

In some implementations, the upscaled video frame is then sent from a participant device 102a-n generating the upscaled video frame to other participant devices 102a-n. In other implementations, where the video frame was received from another participant device 102a-n, the upscaled video frame is output to a display.

As the above discussion is described in the context of a video conference, one skilled in the art will appreciate that the approaches described for upscaling a single video frame is repeatedly applied to multiple frames in video data in order to generate upscaled video data. Moreover, although the above discussion is described in the context of using a machine learning upscaling algorithm and a non-machine learning upscaling algorithm, one skilled in the art will appreciate that the approaches described herein are applicable to the use of any combination of upscaling algorithms with higher and lower relative computational intensity.

Consider an example where multiple participant devices 102a-n are participating in a video conference. A first participant device 102a-n is capable of encoding and sending 4K video data, but only has a camera capable of capturing 1080p video. In some implementations, the first participant device 102a-n generates upscaled video data including multiple upscaled video frames at 4K resolution. The upscaled video frames each include a portion capturing the user and upscaled using a machine learning upscaling algorithm and another portion upscaled using a less computationally intensive upscaling algorithm. The upscaled video frames are then sent to the other participant devices 102a-n for rendering. Thus, the first participant device 102a-n is able to generate upscaled 4K video for other participant devices 102a-n without using the computational resources required in applying a machine learning upscaling algorithm to the entirety of each video frame.

Consider another example where a first participant device 102a-n receives 1080p video frames from a second participant device 102a-n. The first participant device 102a-n generates, from the received 1080p video frames, upscaled 4K video frames using the upscaling module 108a-n for display. Thus, the first participant device 102a-n is able to generate upscaled 4K video from lower resolution video received from other participant devices 102a-n without using the computational resources required in applying a machine learning upscaling algorithm to the entirety of each video frame.

Figure 2A:
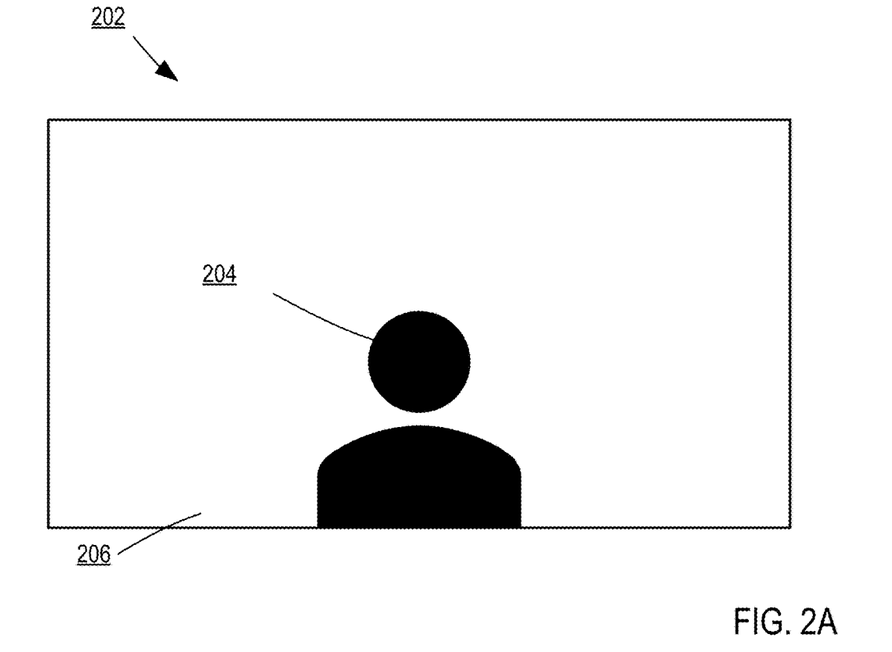
FIG. 2A is part of an example process flow for region of interest (ROI)-based upscaling for video conferences according to some implementations.
Figure 2B:
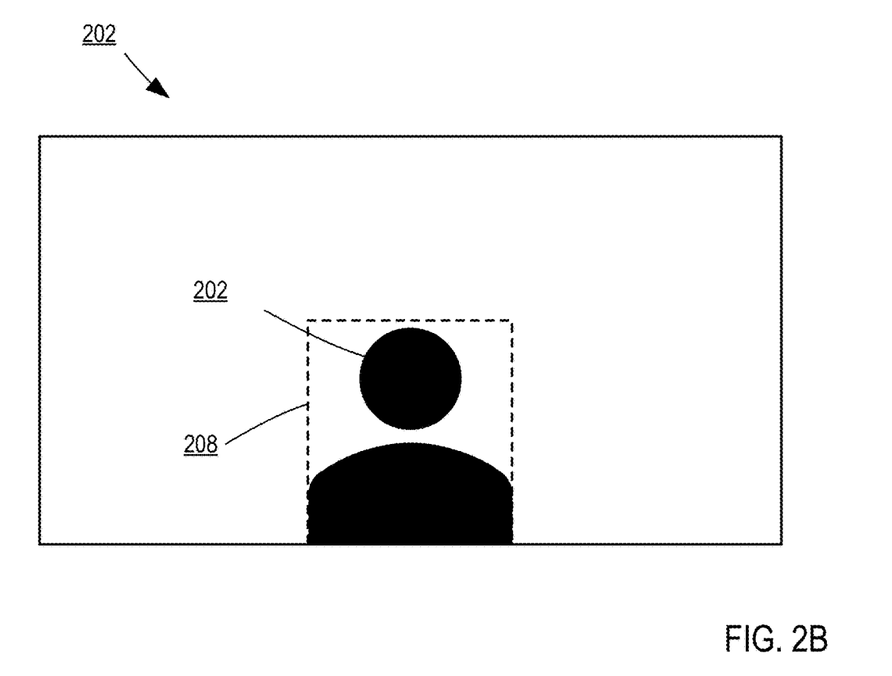
FIG. 2B is part of an example process flow for region of interest (ROI)-based upscaling for video conferences according to some implementations.

FIGS. 2A-3D show an example process flow for ROI-based upscaling for video conferences according to some implementations of the present disclosure. FIG. 2A shows a video frame 202 at a first resolution (e.g., 1080p or another resolution lower before upscaling). The video frame 202 includes an object 204 corresponding to a user of a participant device 102a-n and a background 206 including all pixels other than the pixels of the object 204. At FIG. 2B, a bounding box 208 is identified that includes the object 204.

Figure 2C:
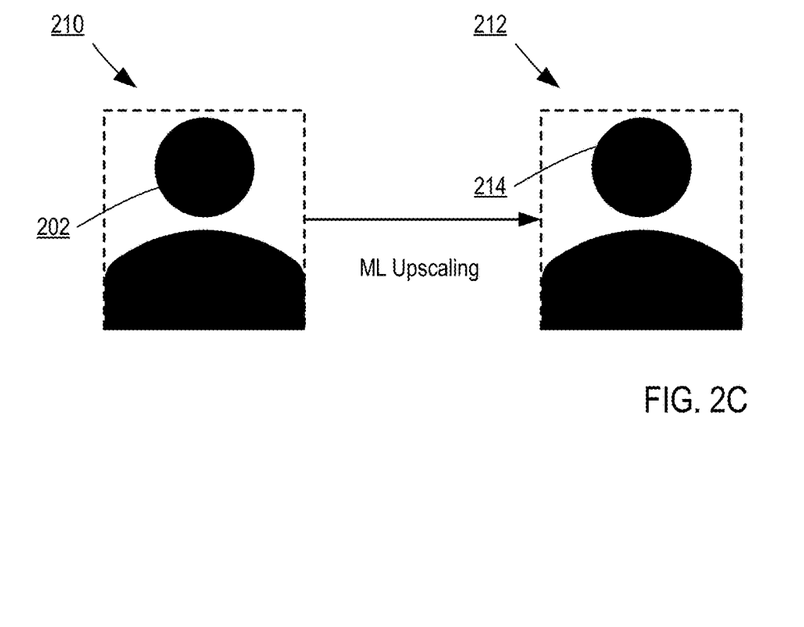
FIG. 2C is part of an example process flow for region of interest (ROI)-based upscaling for video conferences according to some implementations.
Figure 2D:
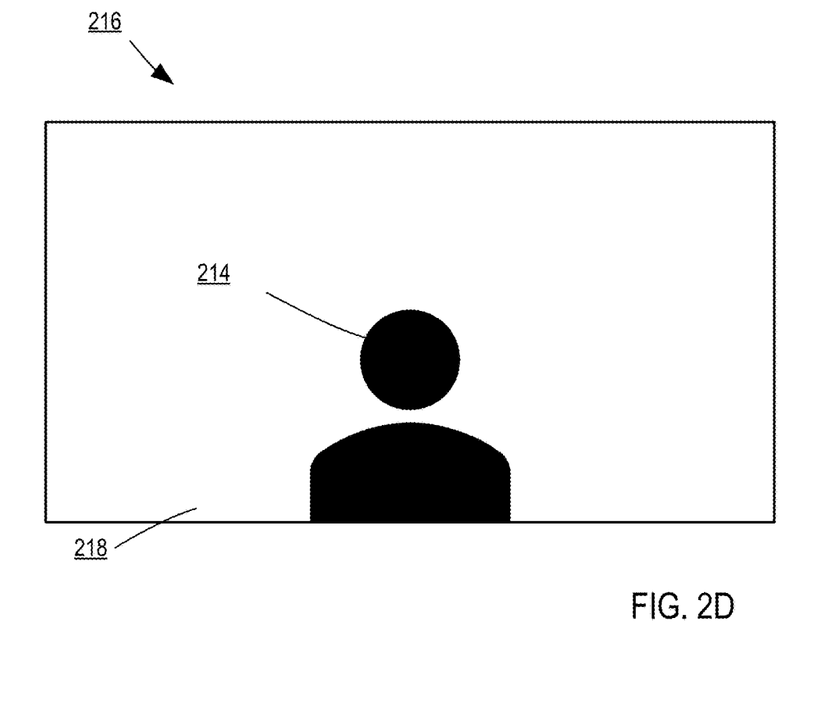
FIG. 2D is part of an example process flow for region of interest (ROI)-based upscaling for video conferences according to some implementations.

At FIG. 2C a machine learning algorithm is applied to a portion 210 of the video frame defined by the bounding box 208 and including the object 204 to generate an upscaled portion 212 including an upscaled object 214. The portion 210 is upscaled to generate the upscaled portion 212 proportionate to the second resolution. For example, assuming the second resolution is four times the first resolution, the upscaled portion 212 is generated at a resolution four times that of the portion 210 prior to upscaling. At FIG. 2D, an upscaled video frame 216 is generated including the upscaled object 214. The upscaled video frame 216 includes a background 218. In some implementations, the background 218 corresponds to a replacement background at the second resolution. For example, the background 218 replaces the background 206 and the pixels of the upscaled object 214 are mapped onto the background 218. In other implementations, the background 218 includes the background 206 upscaled by another upscaling algorithm that is less computationally intensive than the machine learning upscaling algorithm.

ROI-based upscaling for video conferences in accordance with the present application is generally implemented with computers. For further explanation, therefore, FIG. 3 sets forth a block diagram of an exemplary computer 300 configured for ROI-based upscaling for video conferences according to certain implementations. The example computer 300 of FIG. 3 can be a participant device like those of FIG. 1 (102a-n).

Figure 3:
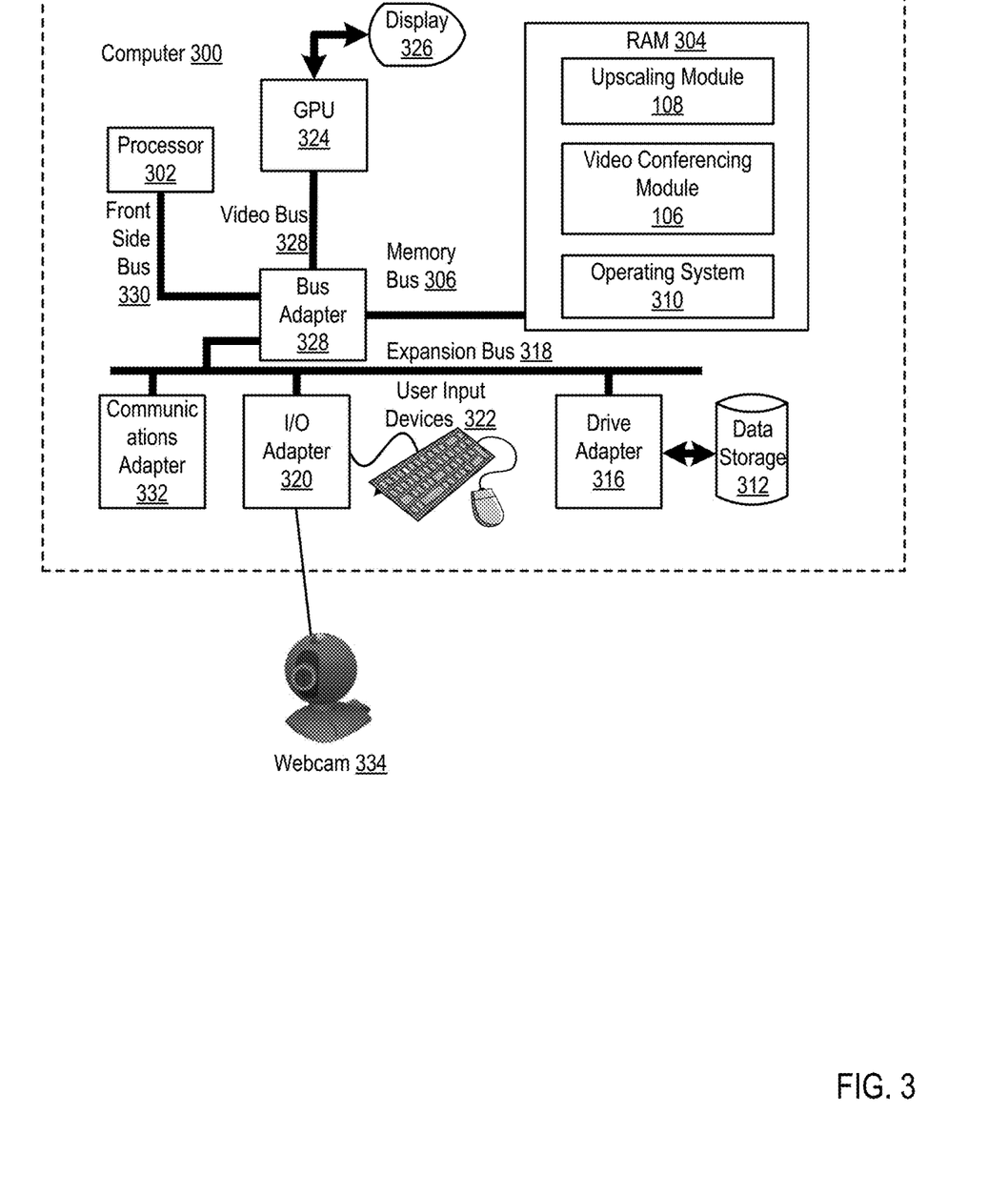
FIG. 3 is a block diagram of an example computer for region of interest (ROI)-based upscaling for video conferences according to some implementations.

The computer 300 of FIG. 3 includes at least one computer processor 302 or 'CPU' as well as random access memory (RAM) 304 which is connected through a high-speed memory bus 306 and bus adapter 328 to processor 302 and to other components of the computer 300. Stored in RAM 304 is an operating system 310. Operating systems useful in computers configured for ROI-based upscaling for video conferences according to certain implementations include UNIX™, Linux™, Microsoft Windows™, and others as will occur to those of skill in the art. The operating system 310 in the example of FIG. 3 is shown in RAM 304, but many components of such software typically are stored in non-volatile memory also, such as, for example, on data storage 312, such as a disk drive. Also stored in RAM 304 are an upscaling module 108 and video conferencing module 106 according to certain implementations.

The computer 300 of FIG. 3 includes disk drive adapter 316 coupled through expansion bus 318 and bus adapter 328 to processor 302 and other components of the computer 300. Disk drive adapter 316 connects non-volatile data storage to the computer 300 in the form of data storage 312. Disk drive adapters useful in computers configured for ROI-based upscaling for video conferences according to certain implementations include Integrated Drive Electronics ('IDE') adapters, Small Computer System Interface (SCSI') adapters, and others as will occur to those of skill in the art. In some implementations, non-volatile computer memory is implemented as an optical disk drive, electrically erasable programmable read-only memory (so-called 'EEPROM' or 'Flash' memory), RAM drives, and so on, as will occur to those of skill in the art.

The example computer 300 of FIG. 3 includes one or more input/output ('I/O') adapters 320. I/O adapters implement user-oriented input/output through, for example, software drivers and computer hardware for controlling output to display devices such as computer display screens, as well as user input from user input devices 322 such as keyboards and mice. The I/O adapter 320 in FIG. 3 couples a webcam 334 to the computing system for use in video conferencing and other applications.

The example computer 300 of FIG. 3 also includes a graphics processing unit (GPU) 324, which is an example of an I/O adapter specially designed for graphics-related computation and output to a display device 326 such as a display screen or computer monitor. GPU 324 is connected to processor 302 through a high-speed video bus 328, bus adapter 328, and the front side bus 330, which is also a high-speed bus.

The exemplary computer 300 of FIG. 3 includes a communications adapter 332 for data communications with other computers and for data communications with a data communications network. Such data communications are carried out serially through RS-232 connections, through external buses such as a Universal Serial Bus ('USB'), through data communications networks such as IP data communications networks, and/or in other ways as will occur to those of skill in the art. Communications adapters implement the hardware level of data communications through which one computer sends data communications to another computer, directly or through a data communications network. Examples of communications adapters useful in computers configured for ROI-based upscaling for video conferences according to certain implementations include modems for wired dial-up communications, Ethernet (IEEE 802.3) adapters for wired data communications, and 802.11 adapters for wireless data communications.

Figure 4:
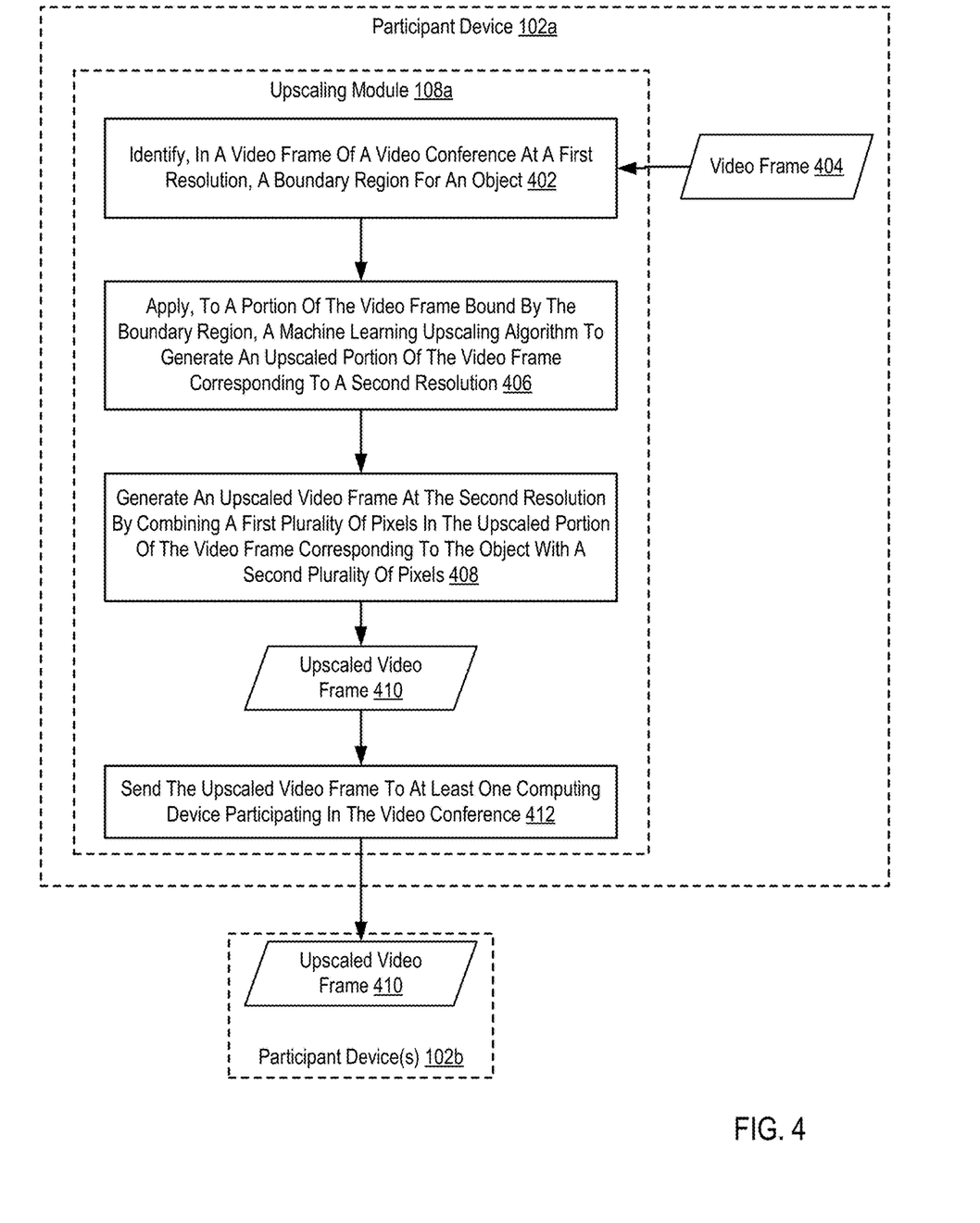
FIG. 4 is a flowchart of an example method for region of interest (ROI)-based upscaling for video conferences according to some implementations.

For further explanation, FIG. 4 sets forth a flow chart illustrating an example method for ROI-based upscaling for video conferences according to implementations of the present disclosure. The method of FIG. 4 is implemented in an upscaling module 108a of participant device 102a. The method of FIG. 4 includes identifying 402, in a video frame 404 of a video conference at a first resolution, a boundary region for an object. The video frame 404 is generated by the same participant device 102a executing the upscaling module 108a. In other implementations, the video frame 404 is received from another participant device 102b-n.

The identified object is an image object (e.g., a particular grouping of pixels) within the video frame 404. The object can correspond to a human participant in the video conference as captured by a camera of a participant device 102a-n used by the human participant. One skilled in the art will appreciate that, in some implementations, the object will correspond to other regions of interest. In some implementations, the object includes a user-selected object. For example, an image segmentation algorithm is applied to the video frame 404 and identifies multiple objects. The object for which the boundary region is identified is then selected from the identified objects. In other implementations, the object is a default object type. For example, the image segmentation algorithm identifies a human object within the video frame 404. The human object is then automatically selected as the object for which the boundary region is identified.

The object is identified within the video frame 404 using an image segmentation algorithm or other algorithm as can be appreciated. After identifying the object, the boundary region for the object is identified. In some implementations, the boundary region includes a bounding box for the object. The bounding box is a two-dimensional rectangular region of pixels into which the identified object is included. For example, in some implementations, the bounding box includes a nearest fitting boundary box for the object (e.g., a bounding box having a minimum width and height so as to completely include the object). In some implementations, the bounding box includes a threshold amount of pixels between the edge of the bounding box and the object (e.g., one, two, or other relatively small number of pixels). For example, one or more sides of the bounding box is separated from a nearest portion of the object by at most the threshold amount of pixels. One skilled in the art will appreciate that boundaries other than a bounding box are also contemplated within the scope of the present disclosure.

The method of FIG. 4 also includes applying 406, to a portion of the video frame 404 bound by the boundary region, a machine learning upscaling algorithm to generate an upscaled portion of the video frame 404 corresponding to a second resolution. The second resolution is higher than the first resolution of the video frame 404 and is the resolution of the resulting upscaled video frame 410 to be described below. The upscaled portion of the video frame 404 corresponds to the second resolution in that the resolution of the portion of the video frame 404 bound by the boundary region is upscaled proportionate to the second resolution. For example, assuming the first resolution is 1080p and the second resolution is 4K, the upscaled video frame 410 will have a resolution four times that of the video frame 404. Accordingly, the upscaled portion of the video frame 404 will have a resolution four times that of the portion of the video frame 404 prior to upscaling.

As set forth above, the portion of the video frame 404 bound by the boundary region includes the object (e.g., the user participating in the video conference). As the boundary region effectively defines the ROI for the video frame 404, a comparatively computationally intensive machine learning upscaling algorithm is applied to this subset of the video frame 404 to produce a higher quality upscaled version of the ROI of the video frame. As an example, the portion of the video frame 404 bound by the boundary region is provided, as input, to a neural network, deep convolutional neural network, or other trained machine learning model to generate the upscaled portion of the video frame corresponding to the second resolution. The resulting upscaled portion of the video frame thus includes an upscaled object.

The method of FIG. 4 also includes generating 408 an upscaled video frame 410 at the second resolution by combining a first plurality of pixels corresponding to the object with a second plurality of pixels. The first plurality of pixels are the pixels in the upscaled portion of the video frame 404 encoding the upscaled object. In some implementations, as will be described in further detail below, the second plurality of pixels include a replacement background (e.g., a replacement background image or video frame) into which the first plurality of pixels is mapped. In some implementations, as will be described in further detail below, the second plurality of pixels includes the pixels of the video frame 404 outside of the boundary region and upscaled using another upscaling algorithm (e.g., an upscaling algorithm less computationally intensive than the machine learning upscaling algorithm).

The method of FIG. 4 also includes sending 412 the upscaled video frame 410 to participant device 102b participating in the video conference. As shown in FIG. 4, the original video frame 404 is generated by a participant device 102a and provided to an upscaling module 108a executed in the same participant device 102a to generate the upscaled video frame 410. The upscaled video frame 410 is then sent to other participant devices 102b for display. In some implementations, however, the participant device that generates the original video frame that is to be upscaled and the participant device that upscales the video frame can be two different devices.

Figure 5:
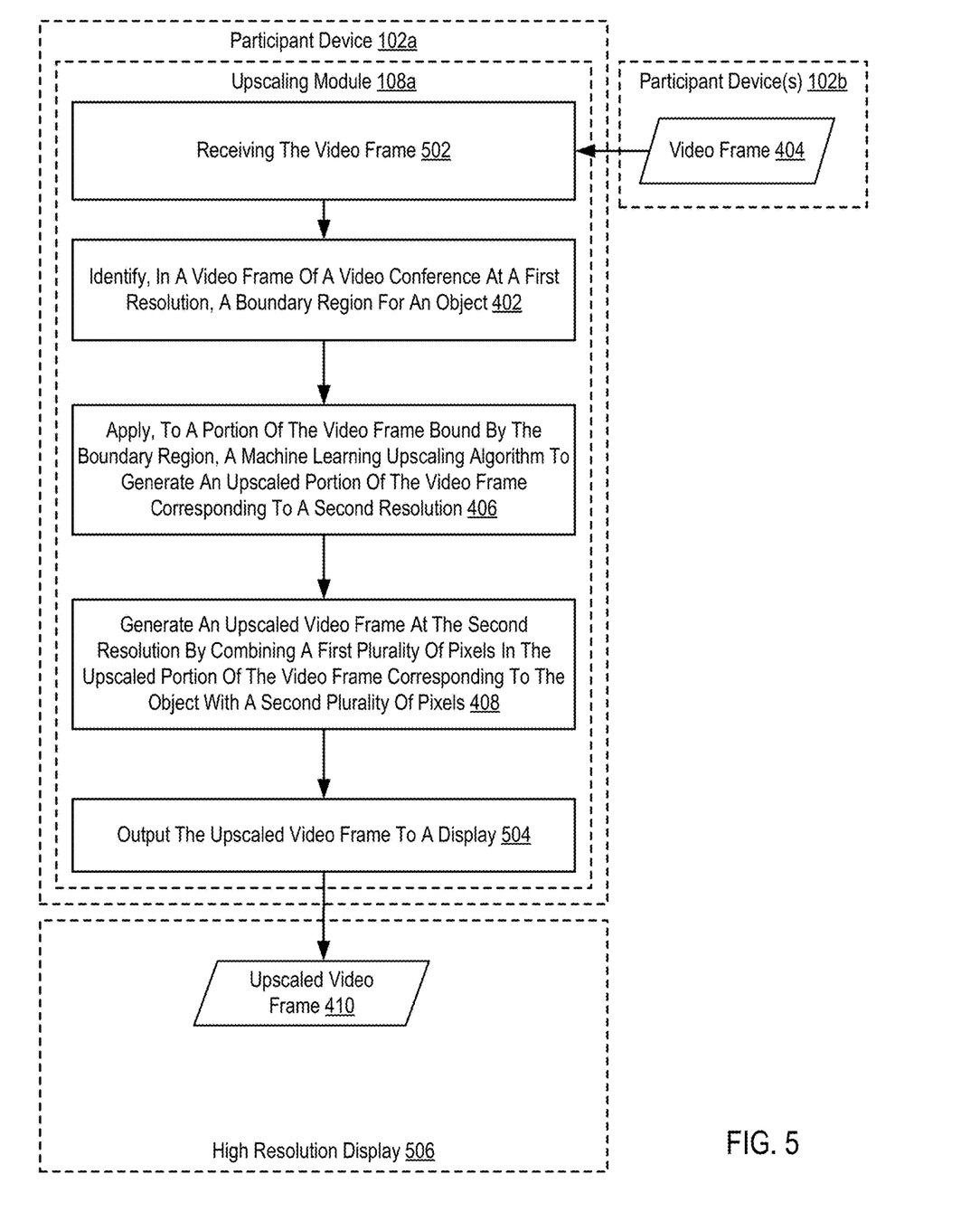
FIG. 5 is a flowchart of another example method for region of interest (ROI)-based upscaling for video conferences according to some implementations.

To that end, FIG. 5 sets forth a flow chart illustrating a variation of ROI-based upscaling for video conferences according to implementations of the present disclosure. The method of FIG. 5 is similar to that of FIG. 4 except that, in the method of FIG. 5, the participant device 102a receives 502 the original video frame to be upscaled from participant device 102b. The video frame 404 captures a user of the participant device 102b participating in the video conference and transmits the video frame to participant device 102a. The receiving participant device 102a then upscales the received video frame 404 to generate an upscaled video frame 410 (as described above).

Once the upscaled video frame is generated, the method of FIG. 5 continues by outputting 504 the upscaled video frame 410 to a high-resolution display 506. The upscaled video frame 410 is rendered (e.g., by a video conferencing module 106a) as part of a video conference user interface and output to the display 506 coupled to the participant device 102a.

Figure 6:
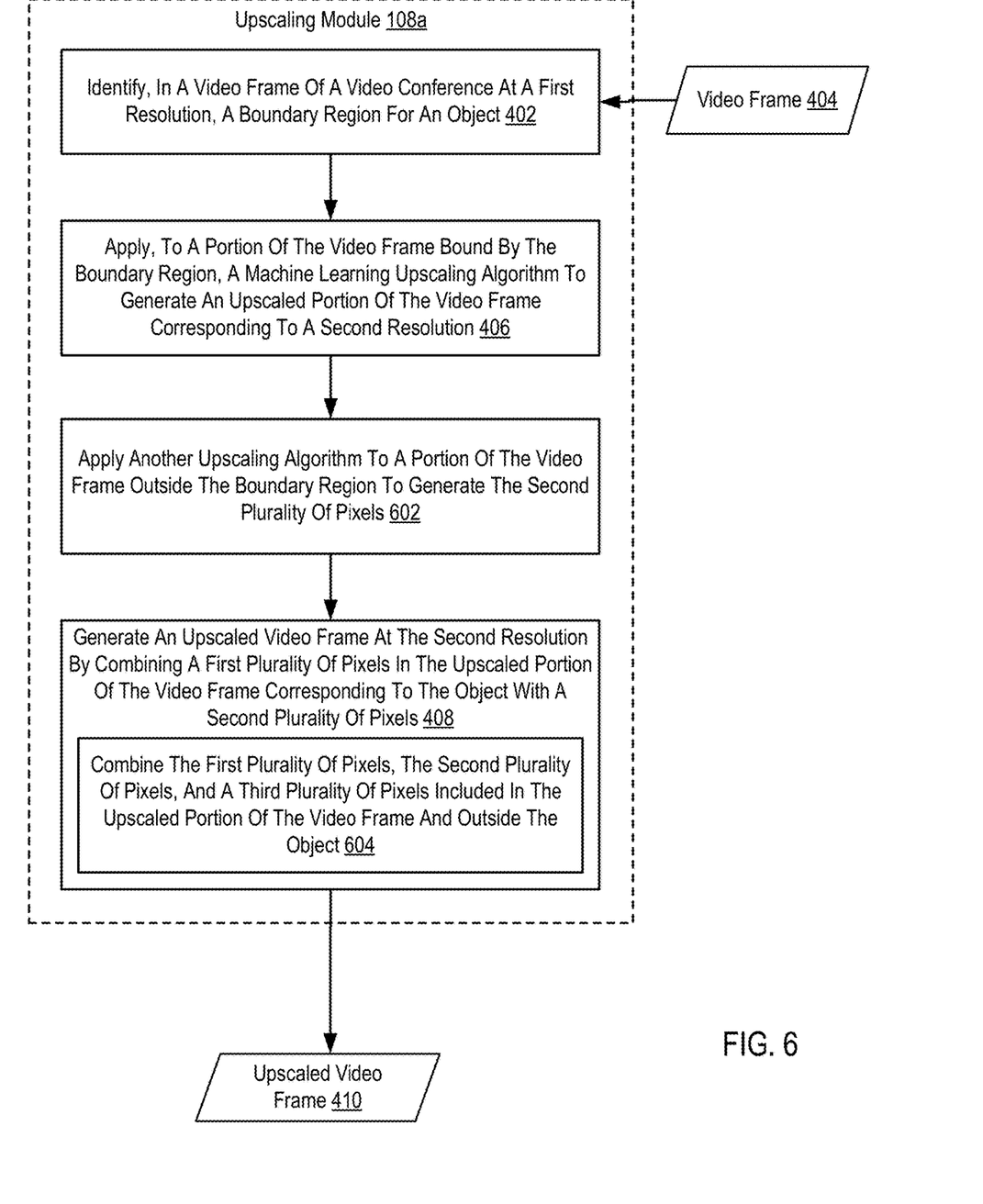
FIG. 6 is a flowchart of another example method for region of interest (ROI)-based upscaling for video conferences according to some implementations.

For further explanation, FIG. 6 sets forth a flow chart illustrating another example method for ROI-based upscaling for video conferences according to implementations of the present disclosure. The method of FIG. 6 is similar to that of FIG. 4 except that the method of FIG. 6 includes applying 602 another upscaling algorithm to a portion of the video frame 404 outside the boundary region to generate the second plurality of pixels. The other upscaling algorithm is a less computationally intensive upscaling algorithm compared to the machine learning upscaling algorithm used to upscale the portion of the video frame 404 inside the boundary region. For example, the other upscaling algorithm requires fewer operations or fewer computational resources in order to generate an upscaled output compared to the machine learning upscaling algorithm. Though the less computationally intensive upscaling algorithm will potentially result in a lesser quality output compared to the machine learning upscaling algorithm, the less computationally intensive upscaling algorithm is only applied to portions of the video frame 404 outside the boundary region (e.g., other than the region of interest). In some implementations, the other upscaling algorithm includes, for example, a nearest-neighbor, bilinear, or bicubic interpolation algorithm, or other algorithm as can be appreciated.

In the method of FIG. 6 generating 408 the upscaled video frame 410 includes combining 604 the first plurality of pixels, the second plurality of pixels, and a third plurality of pixels included in the upscaled portion of the video frame and outside the object. As is set forth above, the first plurality of pixels corresponds to the object in the upscaled portion of the video frame 404 (e.g., the upscaled object). The second plurality of pixels corresponds to the portions of the video frame 404 outside the boundary region and upscaled according to another upscaling algorithm. The third plurality of pixels includes those pixels in the upscaled portion of the video frame 404 but outside the object, also upscaled using the machine learning upscaling algorithm. Thus, the resulting upscaled video frame 410 includes a portion upscaled using the machine learning upscaling algorithm (e.g., within the boundary region) and a portion upscaled using another upscaling algorithm (e.g., outside the boundary region).

Figure 7:
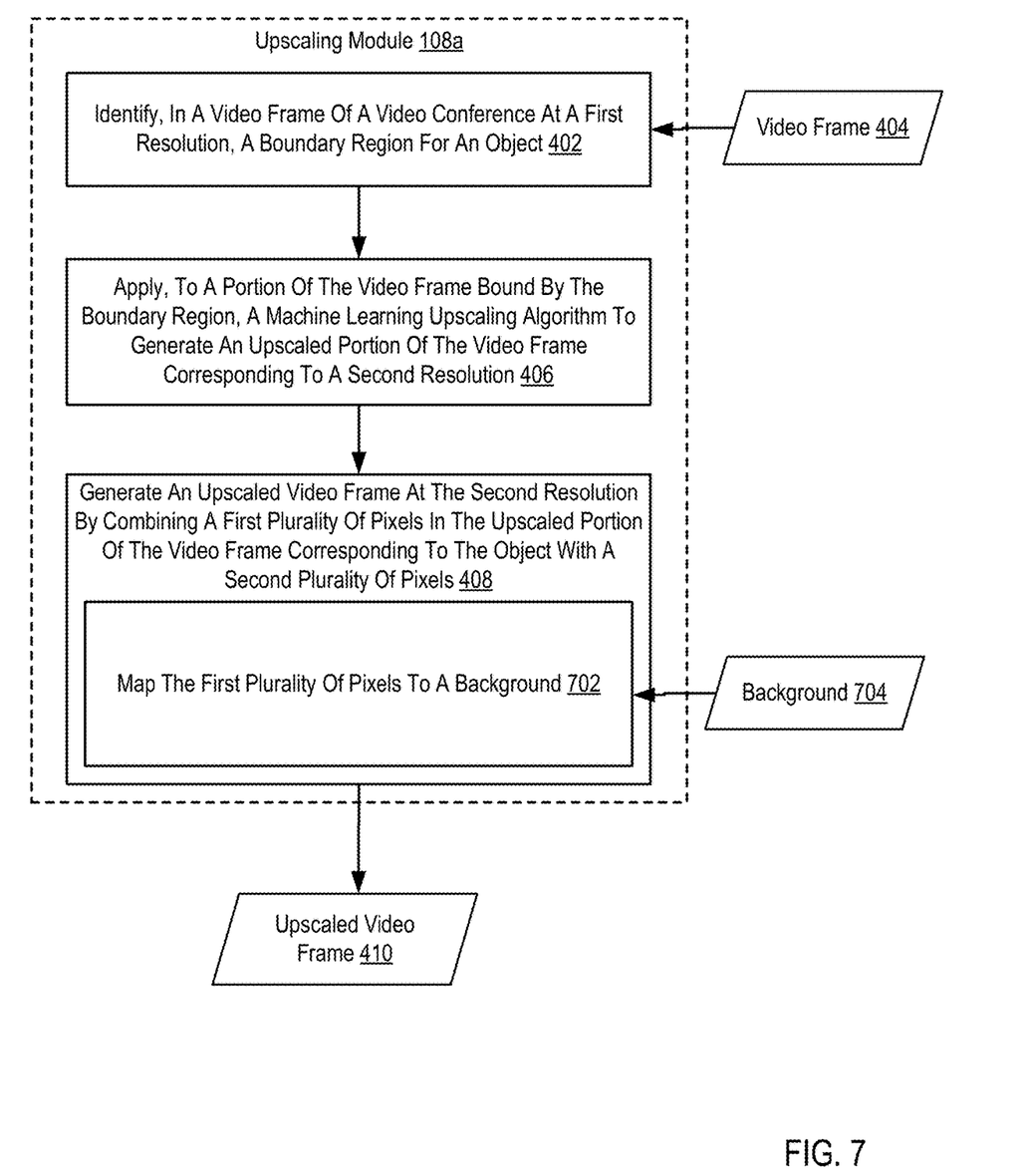
FIG. 7 sets forth a flow chart illustrating an example method of generating an upscaled video frame according to implementations of the present disclosure.

For further explanation, FIG. 7 sets forth a flow chart illustrating an example method of generating an upscaled video frame according to implementations of the present disclosure. In the method of FIG. 7, generating 408 the upscaled video frame at the second resolution includes mapping 702 the first plurality of pixels to a background 704. As is set forth above, the first plurality of pixels corresponds to the upscaled object. The background 704 includes a replacement background image or video frame. For example, assume the video conferencing module 106a-n in FIG. 1 supports background replacement for a video conference whereby the background of video data (e.g., video data other than a user or other region of interest) is removed and replaced with another image or video frame. Thus, the user appears to be overlayed on the replacement background 704. Accordingly, in some implementations, the pixels for the upscaled object are mapped to a background 704 (e.g., a background image or background video frame) at the second resolution. In some implementations, the background is upscaled or downscaled to the second resolution before the pixels of the upscaled object are mapped to the background.

Mapping 702 the first plurality of pixels to the background 704 includes replacing, for each pixel of the first plurality of pixels, a pixel in the background 704 with the corresponding pixel of the first plurality of pixels. Thus, each pixel in the first plurality of pixels is overlayed onto or replaces a pixel in a relative position in the background 704. Thus, the upscaled object is overlayed or mapped onto the background 704.

Exemplary implementations of the present disclosure are described largely in the context of a fully functional computer system for ROI-based upscaling for video conferences. Readers of skill in the art will recognize, however, that the present disclosure also can be embodied in a computer program product disposed upon computer readable storage media for use with any suitable data processing system. Such computer readable storage media can be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the disclosure as embodied in a computer program product. Persons skilled in the art will also recognize that, although some of the exemplary implementations described in this specification are oriented to software installed and executing on computer hardware, nevertheless, alternative implementations implemented as firmware or as hardware are well within the scope of the present disclosure.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some implementations, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to implementations of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various implementations of the present disclosure. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes can be made in various implementations of the present disclosure. The descriptions in this specification are for purposes of illustration only and are not to be construed in a limiting sense. The scope of the present disclosure is limited only by the language of the following claims.

What is claimed is:

1. A method for region of interest based upscaling for video conferences, the method comprising:
   receiving, a video frame of a video conference at a first resolution, and a boundary region for a user-selected object in the video frame, wherein the user-selected object is selected during the video conference;
   applying, to a portion of the video frame bound by the boundary region, a machine learning upscaling algorithm to generate an upscaled portion of the video frame corresponding to a second resolution; and
   generating an upscaled video frame at the second resolution by combining a first plurality of pixels in the upscaled portion of the video frame corresponding to the user-selected object with a second plurality of pixels.

2. The method of claim 1, further comprising sending, from a first computing device participating in the video conference to at least one second computing device participating in the video conference, the upscaled video frame.

3. The method of claim 1, further comprising:
   receiving, from a first computing device participating in the video conference by a second computing device participating in the video conference, the video frame; and
   outputting, by the second computing device to a display, the upscaled video frame.

4. The method of claim 1, further comprising:
   applying another upscaling algorithm to a portion of the video frame outside the boundary region to generate the second plurality of pixels, wherein generating the upscaled video frame comprises combining the first plurality of pixels, the second plurality of pixels, and a third plurality of pixels included in the upscaled portion of the video frame and outside the user-selected object.

5. The method of claim 4, wherein the another upscaling algorithm is a less computationally intensive algorithm relative to the machine learning upscaling algorithm.

6. The method of claim 4, wherein the another upscaling algorithm includes one of a nearest-neighbor algorithm, a bilinear algorithm, or a bicubic interpolation algorithm.

7. The method of claim 1, wherein the second plurality of pixels corresponds to a background at the second resolution, and wherein generating the upscaled video frame comprises mapping the first plurality of pixels to the background.

8. The method of claim 1, wherein the user-selected object is selected from a plurality of identified objects in the video frame.

9. An apparatus for region of interest based upscaling for video conferences, the apparatus comprising:
   a computer processor; and
   a computer memory, the computer memory including computer program instructions that, when executed by the computer processor, cause the computer processor;
   receive a video frame of a video conference at a first resolution, and a boundary region for a user-selected object in the video frame, wherein the user-selected object is selected during the video conference;
   apply to a portion of the video frame bound by the boundary region, a machine learning upscaling algorithm to generate an upscaled portion of the video frame corresponding to a second resolution; and
   generate an upscaled video frame at the second resolution by combining a first plurality of pixels in the upscaled portion of the video frame corresponding to the user-selected object with a second plurality of pixels.

10. The apparatus of claim 9, further comprising computer program instructions that, when executed by the computer processor, cause the computer processor to send, to a computing device participating in the video conference, the upscaled video frame.

11. The apparatus of claim 9, further comprising computer program instructions that, when executed by the computer processor, cause the computer processor to:
   receive from a computing device participating in the video conference, the video frame; and
   output the upscaled video frame to a display.

12. The apparatus of claim 9, further comprising computer program instructions that, when executed by the computer processor, cause the computer processor to:
   apply another upscaling algorithm to a portion of the video frame outside the boundary region to generate the second plurality of pixels,
   wherein generating the upscaled video frame comprises combining the first plurality of pixels, the second plurality of pixels, and a third plurality of pixels included in the upscaled portion of the video frame and outside the user-selected object.

13. The apparatus of claim 12, wherein the another upscaling algorithm is a less computationally intensive algorithm relative to the machine learning upscaling algorithm.

14. The apparatus of claim 12, wherein the another upscaling algorithm includes one of a nearest-neighbor algorithm, a bilinear algorithm, or a bicubic interpolation algorithm.

15. The apparatus of claim 9, wherein the second plurality of pixels corresponds to a background at the second resolution, and wherein generating the upscaled video frame comprises mapping the first plurality of pixels to the background.

16. The apparatus of claim 9, wherein the user-selected object is selected from a plurality of identified objects in the video frame.

17. A computer program product disposed upon a non-transitory computer readable medium, the computer program product comprising computer program instructions for region of interest based upscaling for video conferences that, when executed, cause a computer system to:
   receive a video frame of a video conference at a first resolution, and a boundary region for a user-selected object in the video frame, wherein the user-selected object is selected during the video conference;
   apply to a portion of the video frame bound by the boundary region, a machine learning upscaling algorithm to generate an upscaled portion of the video frame corresponding to a second resolution; and
   generate an upscaled video frame at the second resolution by combining a first plurality of pixels in the upscaled portion of the video frame corresponding to the user-selected object with a second plurality of pixels.

18. The computer program product of claim 17, further comprising computer program instruction that, when executed, cause the computer system to send, to a computing device participating in the video conference, the upscaled video frame.

19. The computer program product of claim 17, further comprising computer program instructions that, when executed, cause the computer system to:
   receive, from a computing device participating in the video conference, the video frame; and
   output the upscaled video frame to a display.

20. The computer program product of claim 17, further comprising computer program instruction that, when executed, cause the computer system to:
   apply another upscaling algorithm to a portion of the video frame outside the boundary region to generate the second plurality of pixels,
   wherein generating the upscaled video frame comprises combining the first plurality of pixels, the second plurality of pixels, and a third plurality of pixels included in the upscaled portion of the video frame and outside a user-selected object.

\* \* \* \* \*